(No Model.) 5 Sheets—Sheet 1.
W. CAREY.
PIPE COUPLING.
No. 462,621. Patented Nov. 3, 1891.
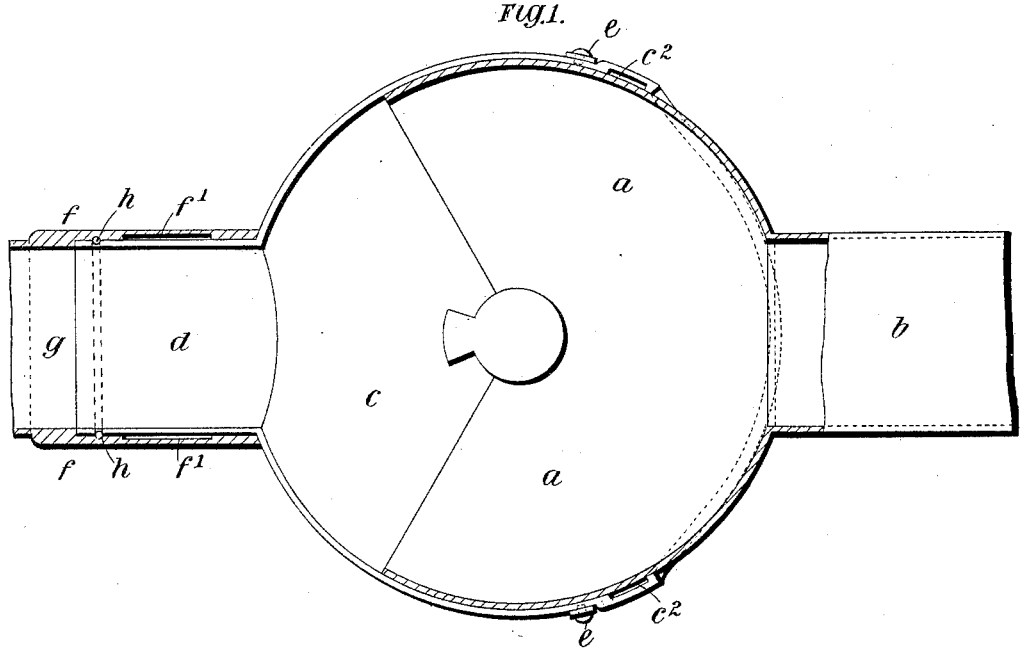
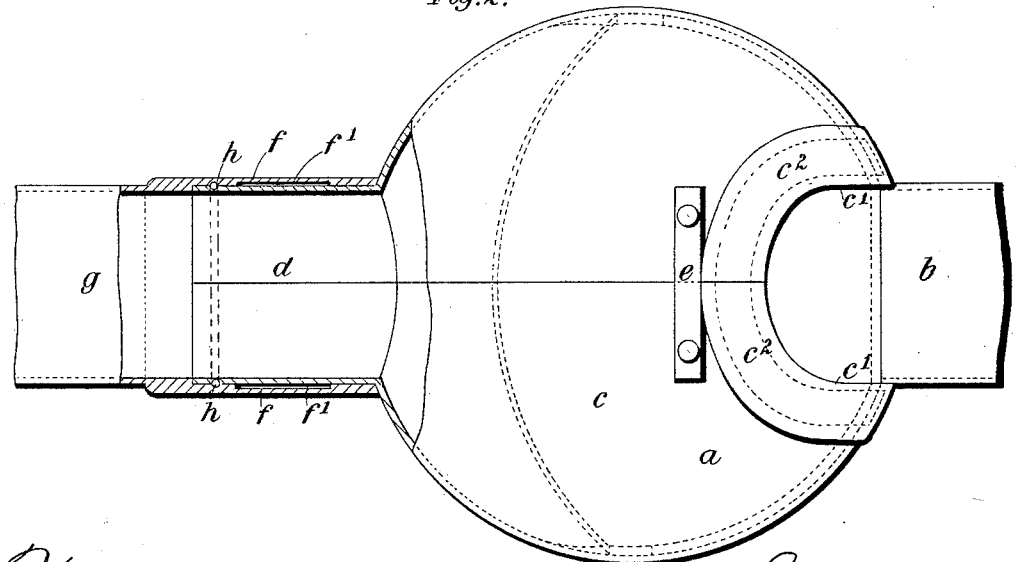
Witnesses: J. A. Rutherford, Geo. W. Rea.
Inventor: William Carey, By James L. Norris, Attorney.

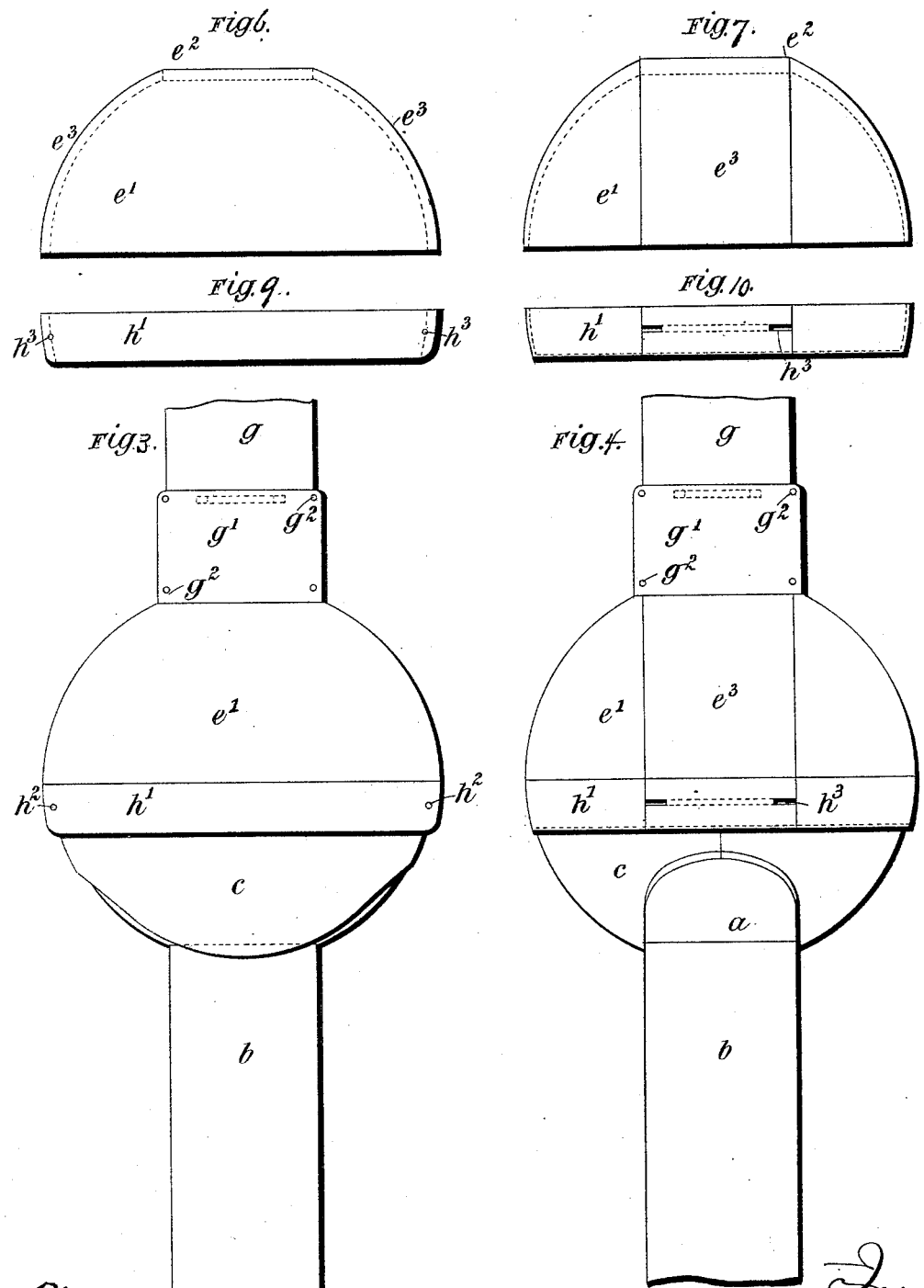

(No Model.)  5 Sheets—Sheet 3.

W. CAREY.
PIPE COUPLING.

No. 462,621.  Patented Nov. 3, 1891.

Witnesses:
J. A. Rutherford.
Geo. W. Rea.

Inventor:
William Carey,
By James L. Norris.
Attorney.

THE NORRIS PETERS CO., PHOTO-LITHO., WASHINGTON, D. C.

(No Model.) 5 Sheets—Sheet 4.

W. CAREY.
PIPE COUPLING.

No. 462,621. Patented Nov. 3, 1891.

(No Model.)  W. CAREY.  5 Sheets—Sheet 5
PIPE COUPLING.
No. 462,621.  Patented Nov. 3, 1891.
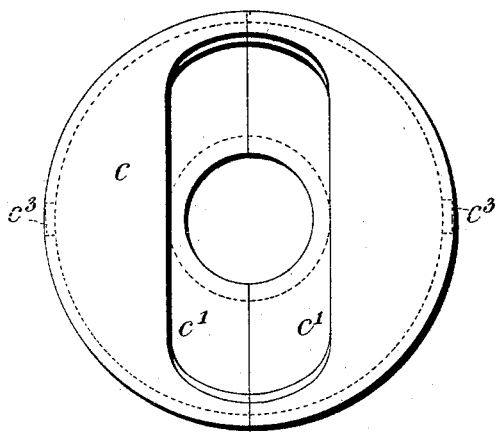
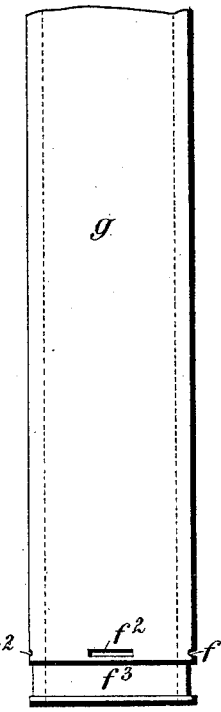
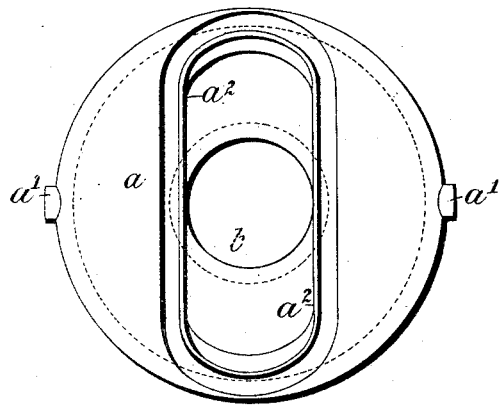
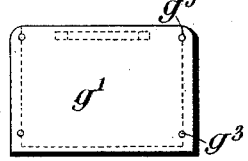

UNITED STATES PATENT OFFICE.

WILLIAM CAREY, OF SOUTHAMPTON, ENGLAND.

PIPE-COUPLING.

SPECIFICATION forming part of Letters Patent No. 462,621, dated November 3, 1891.

Application filed October 14, 1890. Serial No. 368,143. (No model.) Patented in Portugal March 11, 1890, No. 1,553; in England March 21, 1890, No. 4,467, and April 28, 1890, No. 6,494; in Norway March 25, 1890, No. 2,028; in Austria-Hungary April 18, 1890; in Luxemburg September 23, 1890, No. 1,350; in Belgium September 30, 1890, No. 91,995; in Italy November 6, 1890; in Spain November 14, 1890, No. 11,253; in France December 22, 1890, No. 208,036, and in Germany January 6, 1891, No. 54,786.

*To all whom it may concern:*

Be it known that I, WILLIAM CAREY, C. B., Colonel Royal Artillery, a subject of the Queen of Great Britain, and a resident of Southampton, England, have invented certain new and useful Improvements in Pipe-Couplings, (for which I have obtained patents in Great Britain, No. 4,467, dated March 21, 1890, and No. 6,494, dated April 28, 1890; in Germany, No. 54,786, dated January 6, 1891; in France, No. 208,036, dated December 22, 1890; in Belgium, No. 91,995, dated September 30, 1890; in Italy, dated November 6, 1890; in Portugal, No. 1,553, dated March 11, 1890; in Spain, No. 11,253, dated November 14, 1890; in Norway, No. 2,028, dated March 25, 1890; in Luxemburg, No. 1,350, dated September 23, 1890, and in Austria-Hungary, dated April 18, 1890,) of which the following is a specification, reference being had to the accompanying drawings.

My invention relates, chiefly, to pipe-couplings of the kind or class commonly known as "flexible couplings" for permitting angular motion of the different lengths or sections of pipe relatively to each other.

My said invention also relates to couplings whereby the pipes are connected in such a manner that they are capable of rotation about their axes relatively to each other.

Figure 8:
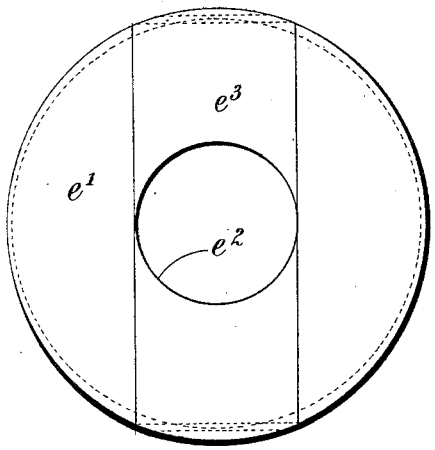
Figure 5:
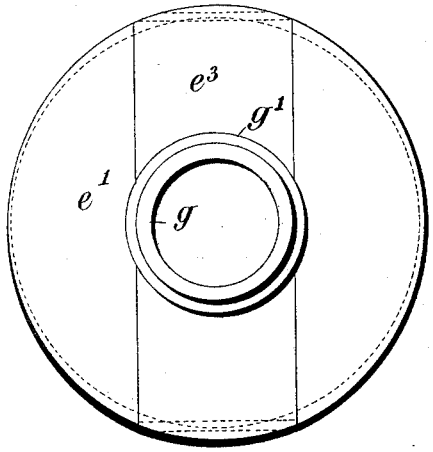
Figure 14:
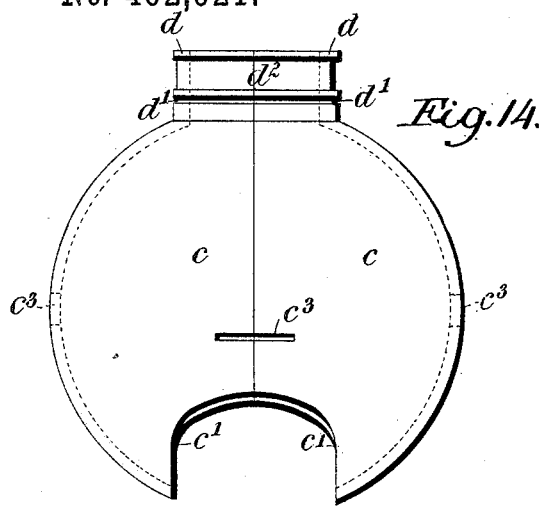
Figure 15:
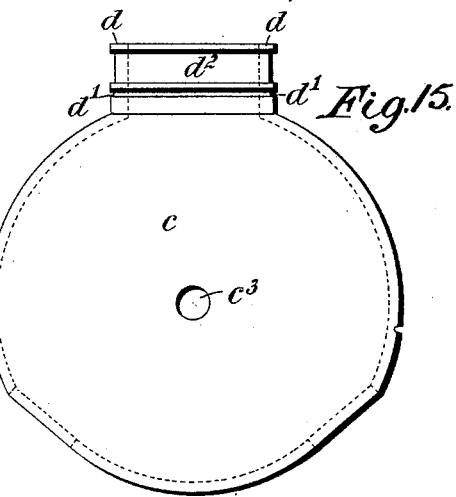
Figure 11:
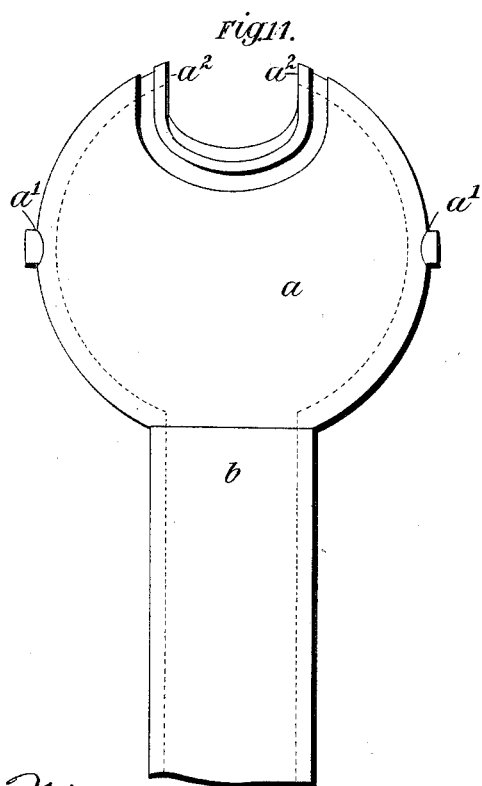
Figure 12:
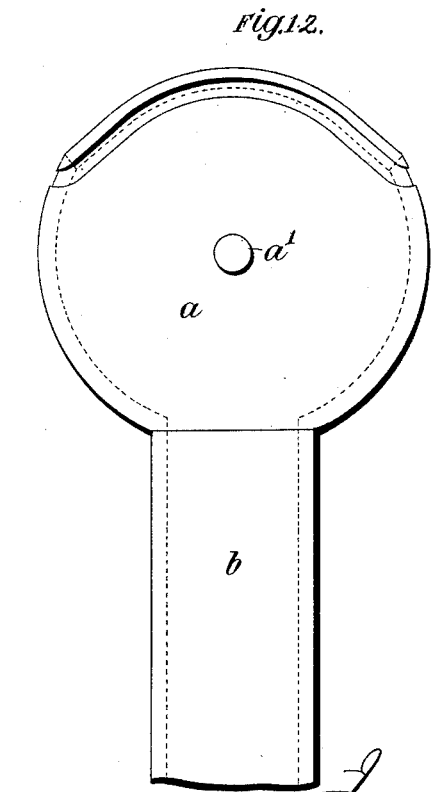

In the accompanying drawings, Figures 1 and 2 show in longitudinal central section lengths or sections of pipes connected by my improved pipe-couplings, so as to form a flexible pipe. Fig. 3 is a side elevation, Fig. 4 a front elevation, and Fig. 5 an end elevation, of another flexible pipe-coupling constructed according to my present invention. Figs. 6 to 10 are separate views of the cap or cover and ring or band hereinafter described. Fig. 11 is a front elevation, Fig. 12 a side elevation, and Fig. 13 an end elevation, showing the internal spherical part of the coupling detached. Figs. 14 to 16 are similar views showing the external spherical part of the coupling detached. Fig. 17 is a side elevation of a pipe-section adapted for connection with my improved coupling, and Fig. 18 is a side elevation of the sleeve hereinafter described.

Like letters indicate corresponding parts throughout the drawings.

In Figs. 1 and 2 the letter $a$ indicates an interior hollow sphere or section of a sphere formed with or attached to one end of a pipe $b$, and $c$ indicates an exterior hollow sphere or section of a sphere having an oblong slot $c'$ and comprising the cylinder or pipe $d$. The sphere $a$ is arranged within the sphere $c$, and the latter with its cylinder or pipe $d$ is divided in a plane parallel to or coincident with the longitudinal axes of the cylinder or pipe $d$ and of the pipe $b$, so as to separate the sphere and the cylinder, respectively, into two distinct hemispheres and two distinct semi-cylinders. The two hemispheres are united edge to edge by transverse clasps or fastenings $e$, and further by the semi-cylinders being inserted into the sleeve or cylinder $f$, provided on the pipe $g$. The said hollow cylinder or sleeve $f$ is retained in position on the cylinder $d$ by means of two split pins $h$, passed through the said cylinders, so that no reasonable amount of strain that may be applied thereto can separate the two parts. To allow of the pipes connected by the joints as above described being moved or adjusted relatively to one another, an oblong slot $c'$ of suitable dimensions is cut or formed in the outer or covering sphere $c$. The pipe $g$ can therefore yield or bend under side or lateral pressure or impact, and the strains which would be set up in a rigid metal pipe are avoided. The cylindrical portion $d$ inclosed in the sleeve $f$ allows of circular or turning motion of one part of the pipe relatively to another part thereof about the axis of the pipe without lengthwise movement of the pipe $g$ relatively to the cylinder or pipe $d$ and without interfering with or interrupting the use of the pipe as a means of supply or discharge of fluids or of solids, such as grain. This turning motion is provided for by cutting or forming on the exterior of the inner cylinder $d$ an annular groove or channel into which the aforesaid split pins project, and which is of such shape in transverse section as to permit of the said cylinder being freely revolved without interference from the split pins, while, as above stated, longitudinal motion of one cylinder within the other is prevented by the said split pins or the like.

To make the joint air, gas, and water tight, a groove $f'$ is cut in the working surface of the cylindrical portion $f$, and a groove $c^2$ is formed around the slot $c'$ in the working surface of the spherical portion $c$ of the joint. These grooves may be cut either on the inner surface of the said cylinder $f$ and the sphere $c$ or on the outer surface of the inner cylinder $d$ and spherical sector $a$ of the joint, as may be convenient. In each of these grooves is placed a ring or band of some elastic substance, such as india-rubber, the thickness of which but slightly exceeds the depth of the groove added to the space or clearance between the two cylinders or spheres. I prefer that the amount of this excess shall not be more than one-thousandth of an inch, or thereabout, so that however slight the pressure exerted to force this excess within the said space the same is entirely filled, and nothing can pass between the surfaces of the elastic substance and those of the metal, which meet or bear one against the other. The joint will therefore be hermetically sealed; in other words, it will be gas, air, or water tight. The amount of surface of the elastic band or ring can thus be made so small that the pressure or thrust thereon will not be more than a few ounces. If the said ring or band were made without regard to consistency or uniformity of the material of which it is composed or too thick to readily enter the space formed by the groove and clearance, the pressure necessary to cause the same to enter the space would be increased and so set up friction, while if the space be not entirely filled leakage will ensue.

By carefully smoothing and polishing the metal surface in contact with the elastic band and correspondingly smoothing the surface of the band the amount of friction may be very much diminished, while, on the other hand, if the opposite surfaces of the groove and elastic band are made more or less rough it will insure a certain amount of adhesion or grip, and the elastic band will be held firmly in position by the friction set up and by one end butting against the farther edge of the metal groove. I do not, however, restrict myself to this mechanical means of securing the elastic substance in its place, but in certain instances prefer to produce adhesion between the surface of the cylinder and the elastic band or the like by the use of suitable cement or by chemical compounds or substances which will produce the same effect. My improved joint or connection is therefore partly cylindrical and partly spherical, and can be used as a cylindrical or as a spherical joint, or as a cylindrical and spherical joint combined, as may be required, the cylindrical joint permitting motion about the axis of the pipe and the spherical joint giving flexibility to the pipe. I sometimes make the said joints steam-tight by the substitution of metal for elastic bands in the said grooves. Metals when subjected to heat expand, and such expansion varies with the metal and with the temperature to which it is subjected. Therefore, taking advantage of such properties and choosing a softer and more-rapidly-expanding metal than that of which the joint is made and introducing it in the groove in lieu of the elastic substance, the expansion effects the rapid filling up of the clearance or working space between the two metal surfaces, and a practically steam-tight joint with a minimum frictional resistance is obtained. This joint is applicable to all work requiring a movable joint, whether for operations on land, sea, or for submarine work, such as deep-sea-diving operations.

For pipes designed to resist high internal pressure I prefer to use couplings constructed as hereinafter described with reference to Figs. 6 to 21, in which $a$ is a hollow sphere formed on or firmly attached to one end of a pipe $b$ and forming one portion of my flexible coupling. $cc$ are two hollow hemispheres, each of which is provided with a hollow semi-cylindrical extension $d$ and which are adapted to be fitted over the said hollow sphere $a$, the edges of the said hemispheres meeting around the sphere $a$. The said sphere $a$ is formed with external projecting pivots or trunnions $a'$, situated at diametrically-opposite parts of the sphere, preferably at right angles to the axis of the pipe $b$, and the hemispheres $c$ are provided, respectively, with recesses, holes, or bearings $c^3$, into which fit the pivots $a'$. By arranging the pivots in this manner I effectually obviate the liability to leakage around the same. A recess $c'$ is formed in each hemisphere $c$ in such a manner that when the two hemispheres are placed together the said recesses form a slot or opening adapted to embrace the pipe $b$, the said slot being of such a length as to allow of the hemispheres turning about the pivots $a'$ through the desired angle of flexibility of the coupling. The hemispheres are secured together by an external hemispherical cap or cover $e'$, having an opening $e^2$ to allow of its being passed over the divided tubular extension $d$. The said cap or cover is constructed to fit accurately the surface of the hemispheres, and when held down on the said hemispheres effectually prevents their separation by internal pressure.

I retain as much as is practicable of the inner sphere, so that the fluid-pressure is only allowed to act upon a limited area of the surface of the divided outer sphere. It is only necessary in order to allow the free passage of the fluid through the coupling at all times to cut out a portion of the inner sphere equal in width to the bore of the pipe connected with the divided outer sphere and of such length that when one sphere is at either extremity of its angular movement relatively to the other sphere the aperture of the said pipe will not be closed or covered. A slot $a^2$, having semicircular ends, is for this purpose formed in the sphere $a$ opposite to the pipe $b$ and at right angles to the axis of the pivots $a'$. The width of this slot is equal to the bore of the divided tubular extension $d$, so that the parallel edges of the slot guide such tube or cylinder $b$, and the length of the slot is such that the thoroughfare through the tubular extension $d$ will always be fully open whatever may be the position of the outer sphere relatively to the inner sphere—that is to say, the slot $a^2$ is so formed as to permit the turning of the one sphere relatively to the other sphere to either extremity of its angular movement without at any time closing or covering the aperture of the tubular extension $d$.

To provide for retaining the cap or cover $e$ in contact with the divided sphere $c$, the pipe $g$, Fig. 17, to be connected with the coupling may be constructed with a socket adapted to fit over the tubular extension $d$ and abut against the cap $e'$. I prefer, however, in lieu of forming a socket on the pipe $g$, to merely arrange the said pipe so that it abuts against the end of the tubular extension $d$ and to provide a collar or sleeve $g'$, which can slide to and fro upon the said pipe $g$ and tubular extension $d$, the said collar or sleeve being secured when in position by pins passing through holes $g^3$ in the sleeve and entering grooves $f^2$ $d'$ formed around the pipe $g$ and extension $d$, respectively. The united shearing strength of the pins must be sufficient to resist any reasonable stress that may be brought to bear on the joint. Grooves $f^3$ $d^2$ are formed in the pipe $f$ and extension $d$, respectively, and the said grooves are filled with metallic or with india-rubber or other suitable elastic material rings to insure a tight joint. It will be seen that this joint or coupling is capable of rotary motion about the axis of the pipe $g$ as well as of the bending or angular movement about the pivots or trunnions $a'$.

The spherical joint may be made air, gas, and water tight by the means above described. I prefer, however, that the groove for containing the elastic or metallic jointing-ring, when such is employed, should be formed in the exterior surface of the sphere $a$ around the edge of the slot or opening $a^2$, thus avoiding any leakage past the said slot and insuring that the only pressure allowed to bear on the inclosing hemispheres is that due to the surface exposed by the said slot $a^2$, or I insure tightness of the joint by making the water-proof substance adhere to the exterior surface of the sphere around the slot $a^2$.

It is not necessary to make the divided sphere $c$ of sufficient strength to alone resist the internal pressure acting on the surface exposed by the slot or opening $a^2$, inasmuch as the said sphere is re-enforced by the external closely-fitting cap or cover $e'$, which bears a portion of the stress. I therefore make the sphere $c$ of sufficient strength, for example, to resist half the internal pressure, or thereabout, and the cover $e'$ of sufficient strength to resist the remainder of such pressure. I prefer, moreover, to minimize the weight of the joint by making the cover $e'$ of the desired thickness for resisting the internal pressure only at that part which is exposed to the pressure—that is to say, at that part which is immediately over the slot $a^2$—the remainder of the cap or cover being tapered gradually from this thickness down to the smallest desirable thickness consistent with the nature of the material of which the cover is made and the purpose for which it is intended. The part of the cover having the maximum thickness forms a spherical strip $e^3$ of the same width or slightly wider than the opening $a^2$, and the reduction or tapering of the thickness of the remainder of the cover is clearly indicated in Figs. 5, 7, and 8.

In some cases, where the amount of flexibility required of the joint is such that the slot or opening $a^2$ would not be entirely covered by the cap $e'$ when the joint is bent to the full extent, I provide an additional supporting or re-enforcing ring, band, or zone $h'$, Figs. 9 and 10, which is passed over the pipe $b$ and secured on the sphere $c$ by pins $h^2$, passing through holes $h^3$ formed in the ring $h'$ and entering suitable grooves in the divided sphere $c$, or I retain the cap or cover $e'$ and the ring or band $h'$ upon the divided sphere $c$ by securely fastening together the said cap and ring or band.

In the several constructions shown, except Figs. 3 to 10, inclusive, the sphere $c$ and its cylinder extension are divided in a plane parallel to the longitudinal axis of such cylinder extension, as hereinbefore specifically described with reference to Figs. 1 and 2, and in all the constructions the oblong slot in the exterior sphere is provided with parallel side edges that act as guides for the pipe on the interior sphere. By dividing the exterior sphere and its cylinder extension in th manner described I am enabled to accuratel assemble the parts with facility, and, moreover, the sleeve $f$ of the pipe $g$ by surrounding the divided parts of the cylinder extension aids in holding the two parts of the exterior sphere in proper relative position, so that simple and economical clasps $e$ can be employed for connecting the said sections of the sphere.

It is obvious that my improved coupling offers special facilities for putting together and taking to pieces to examine when necessary the interior without disturbing the lines of pipes, and, moreover, mistakes cannot occur in refixing without the error being apparent before the coupling is brought into use.

Although my improved coupling is specially adapted for resisting internal pressure, it is obvious that my improvements are also applicable to couplings to be used for resisting external pressure.

By dividing the outer sphere longitudinally instead of transversely, as heretofore, I am enabled to use an outer sphere having an elongated slot with parallel edges which bear against and guide the pipe attached to the inner sphere. I can thus, while retaining the advantage of great range of angular motion in a spherical joint, minimize the area of that portion of the inner sphere which is unprotected by the material of the outer sphere. Consequently the inner sphere can be made much lighter than would otherwise be necessary. I also obtain the further advantage that I can use an inner hollow sphere which is almost a complete sphere, the only portion which it is necessary to omit being such as will permit communication between the interior of this sphere and the pipe attached to the outer sphere in any relative position to which the said spheres may be turned.

What I claim is—

1. A pipe-coupling comprising an outer hollow sphere provided at one side with an elongated slot having parallel edges and at the other side with a hollow cylindrical extension and divided longitudinally, an inner hollow sphere or portion of a sphere inclosed within the outer sphere and movable therein and having a hollow cylindrical extension or pipe which works in the said slot, and a hollow cylinder or sleeve which is fitted and retained upon the cylindrical extension of the outer sphere and is free to rotate thereon, substantially as and for the purposes above specified.

2. A pipe-coupling consisting of an interior hollow sphere having an attached pipe or cylinder, an exterior sphere provided at one side with a cylindrical extension and at the opposite side with an oblong slot having parallel side edges which bear against and guide the pipe or cylinder on the interior sphere, the exterior sphere and its extension being divided lengthwise of the pipe into two parts, and fastening devices for holding together the two parts of the exterior sphere, substantially as described.

3. A pipe-coupling consisting of an interior hollow sphere having an attached pipe or cylinder, a hollow exterior sphere provided with a cylinder, and with such cylinder divided longitudinally in a plane parallel with the axis of the cylinder to separate the sphere and cylinder, respectively, into distinct hemispheres and semi-cylindrical sections, and fastening devices connecting the hemispheres together, substantially as described.

4. A pipe-coupling consisting of an interior hollow sphere having an attached pipe or cylinder, pivots or trunnions whose axes are at right angles to the axis of the said pipe, an exterior sphere having an oblong slot with parallel side edges which bear against and guide the said pipe and provided internally with bearings for the said pivots or trunnions, the exterior sphere being divided longitudinally into two parts to permit the insertion of the interior sphere, and fastening devices for securing together the two parts of the exterior sphere, substantially as described.

5. A pipe-coupling consisting of an interior hollow sphere having at one side an elongated slot surrounded by a groove containing jointing material and at the other side an attached pipe or cylinder, an exterior cylinder having at one side an attached pipe or cylinder and at the other side an elongated slot with parallel side edges which bear against and guide the pipe on the interior sphere, the exterior sphere and its attached pipe or cylinder being divided longitudinally into two parts, and fastening devices for securing together the two parts of the exterior sphere, substantially as described.

6. A pipe-coupling consisting of an interior hollow sphere having an attached pipe or cylinder, an exterior sphere having at one side an attached pipe or cylinder and at the other side an elongated slot with parallel side edges which bear against and guide the pipe on the interior sphere, the said exterior sphere and its attached pipe or cylinder being divided longitudinally into two parts, and a portion or zone of a sphere fitting closely upon the divided sphere and secured thereon, substantially as described.

7. A pipe-coupling consisting of an interior hollow sphere having an attached pipe or cylinder, an exterior sphere having at one side an attached pipe or cylinder and at the other side an elongated slot with parallel side edges which bear against and guide the pipe on the interior sphere, the said exterior sphere and its attached pipe or cylinder being divided longitudinally, portions or zones of a sphere fitted upon the divided sphere from opposite sides thereof, and fastening devices for securing together the said portions or zones of a sphere, substantially as described.

In testimony whereof I have hereunto signed my name in the presence of two subscribing witnesses.

WILLIAM CAREY.

Witnesses:
DAVID YOUNG,
CHAS. B. BURDON.